United States Patent
Lee et al.

(10) Patent No.: US 10,533,913 B2
(45) Date of Patent: Jan. 14, 2020

(54) SYSTEM AND METHOD FOR ESTIMATING CENTER OF GRAVITY OF WALKING REHABILITATION ROBOT

(71) Applicant: KOREA POLYTECHNIC UNIVERSITY INDUSTRY ACADEMIC COOPERATION FOUNDATION, Siheung-si Gyeonggi-do (KR)

(72) Inventors: Eung Hyuk Lee, Bucheon-si (KR); Su Hong Eom, Incheon (KR); Won Young Lee, Jeollabuk-do (KR)

(73) Assignee: KOREA POLYTECHNIC UNIVERSITY INDUSTRY ACADEMIC COOPERATION FOUNDATION, Siheung-si, Gyeonggi-Do ( * ) Notice: Subject to any disclaimer, the term of this patent is extended or adjusted under 35 U.S.C. 154(b) by 320 days.

(21) Appl. No.: 15/529,860
(22) PCT Filed: Oct. 2, 2015
(86) PCT No.: PCT/KR2015/010432
§ 371 (c)(1),
(2) Date: May 25, 2017
(87) PCT Pub. No.: WO2016/099016
PCT Pub. Date: Jun. 23, 2016

(65) Prior Publication Data
US 2017/0268953 A1    Sep. 21, 2017

(30) Foreign Application Priority Data
Dec. 19, 2014    (KR) .................. 10-2014-0184693

(51) Int. Cl.
*G01M 1/12*    (2006.01)
*B25J 13/08*   (2006.01)
*G01L 1/20*    (2006.01)

(52) U.S. Cl.
CPC ........... *G01M 1/122* (2013.01); *B25J 13/081* (2013.01); *B25J 13/085* (2013.01); *G01L 1/20* (2013.01)

(58) Field of Classification Search
CPC .. G01M 1/122; G01L 1/22; G01L 1/20; B25J 13/081; B25J 13/085; A61H 3/00;
(Continued)

(56) References Cited

U.S. PATENT DOCUMENTS 9,050,540 B1 *  6/2015  Norman .................. A63H 17/00
2004/0169504 A1   9/2004  Son et al.
(Continued)

FOREIGN PATENT DOCUMENTS

JP    2005-093128 A    4/2005
JP    2007-312877 A   12/2007
(Continued)

*Primary Examiner* — Mohammad K Islam
(74) *Attorney, Agent, or Firm* — Novick, Kim & Lee, PLLC; Jae Youn Kim

(57) ABSTRACT

Provided are a system and method for estimating the center of gravity of a walking rehabilitation robot, the system being provided with: a sensor module for estimating the point of the center of gravity, and provided with: a sensor unit mounted on a footplate to sense the pressure when a person walks; output means for outputting a voltage value corresponding to preset conditions according to a pressure signal sensed by the sensor module; and estimating means for calculating an angle value corresponding to the voltage value outputted by the output means, and estimating the center of gravity, wherein a body center can be estimated by obtaining an accurate detection using a small-sized system that has a relatively low-cost sensor module installed therein.

5 Claims, 12 Drawing Sheets

(58) Field of Classification Search
CPC .......... A61H 2201/165; A61H 2201/50; A61H 2201/5061; A61H 2230/625; A61H 2201/164
See application file for complete search history.

(56) References Cited

U.S. PATENT DOCUMENTS

| | | | | |
|---|---|---|---|---|
| 2009/0018464 | A1* | 1/2009 | Watanabe | A61B 5/0537 600/547 |
| 2010/0010639 | A1* | 1/2010 | Ikeuchi | A61H 3/008 623/24 |
| 2010/0063779 | A1* | 3/2010 | Schrock | A43B 3/00 702/188 |
| 2010/0271051 | A1* | 10/2010 | Sankai | A61B 5/1038 324/679 |
| 2011/0175736 | A1* | 7/2011 | Shieh | A61B 5/4023 340/573.1 |
| 2011/0251520 | A1* | 10/2011 | Shieh | A43B 3/0005 600/587 |
| 2012/0253234 | A1* | 10/2012 | Yang | A61B 5/1038 600/595 |
| 2015/0239499 | A1* | 8/2015 | Lan | G01L 1/22 701/41 |
| 2016/0113584 | A1* | 4/2016 | Galasso | A61B 5/0077 |
| 2016/0128642 | A1* | 5/2016 | Barralon | A61B 5/6887 600/592 |
| 2016/0310342 | A1* | 10/2016 | Lee | A61B 5/1038 |
| 2016/0331625 | A1* | 11/2016 | Sankai | B25J 9/0006 |

FOREIGN PATENT DOCUMENTS

| | | |
|---|---|---|
| JP | 10-1138012 B1 | 4/2012 |
| JP | 2012-167939 A | 9/2012 |
| KR | 10-0651639 B1 | 11/2006 |
| KR | 10-2011-0076418 A | 7/2011 |
| KR | 10-1246874 B1 | 3/2013 |
| KR | 10-1250324 B1 | 4/2013 |

* cited by examiner

US 10,533,913 B2

SYSTEM AND METHOD FOR ESTIMATING CENTER OF GRAVITY OF WALKING REHABILITATION ROBOT

TECHNICAL FIELD

The present invention relates to a system and a method for estimating a center of gravity of a walking rehabilitation robot, and more particularly, to a system and a method for estimating a center of gravity, in which the system is provided with a sensor module for estimating the center of gravity of a walking rehabilitation robot, so as to estimate a position of the center of gravity.

BACKGROUND ART

Recently, the senior population is rapidly increasing as the human lifespan extends due to improvement of a dietary life and development of a medical technology. The senior citizens have functional differences compared to the young people due to the aging of body functions. The functional differences include delayed body response time, a decreased cognitive function, and reduced equilibrium sensation. For this reason, the walking of the senior citizens becomes limited in terms of a speed, a step length, walking frequency, a behavior range and angular velocity of a joint, equilibrium sensation and the like.

Abnormal walking of the senior citizens is a major obstacle to activities of daily living (ADL), which leads to passive social participation. Therefore, in order to improve the quality of life (QOL) of the senior citizens, it is necessary to rehabilitate the walking of the senior citizens.

In order to recover the walking function of the senior citizens, it is necessary to maintain and increase the muscular strength through the systematic and repetitive rehabilitation exercise. In other words, it is important for the senior citizens to exercise regularly every day to maintain a healthy life for the rest of their life. In the case of the senior citizens with free of behavior, they may regularly perform light exercise by going to a nearby mineral spring at dawn every day or walking around the county. However, if a person has a difficulty in behavior due to the high age or disease, it is dangerous and difficult to exercise outdoors.

In addition, for rehabilitation patients who may not easily move their bodies due to various industrial accidents, traffic accidents, or diseases such as strokes, the best way to get back to a previous healthy body is to regularly perform rehabilitation exercise for a fixed time every day even at home. A robot-type walking exercise device that allows upright walking exercise by fixing the body has been released, but the device is expensive, so that it is difficult to be purchased. In addition, an exercise device that enables the senior and infirm citizens or the rehabilitation patient to easily fix the body so as to safely perform walking and running exercise is required.

This training can be performed by using robots. The robots may easily implement repetitive motions and may support the posture of the trainees, so that safety can be assured and high training effects can be expected. In reality, there are an increasing number of effective cases of rehabilitation using robots in nerve rehabilitation treatment, so that rehabilitation medical community has shown much attention in treatment using robots.

In other words, the muscular strength has to be maintained and increased through exercise in order to recover the walking function of the senior citizens. To this end, it is necessary to understand the walking characteristics of the person to organize an appropriate rehabilitation program, and to perform systematic and repetitive rehabilitation training through the rehabilitation program. In order to perform the rehabilitation training, many assistive devices are used to support the senior citizens. The assistive devices may easily implement repetitive motions and may support the posture of the patient, so that safety can be enhanced and training effectiveness can be improved. In reality, there are an increasing number of effective cases of rehabilitation using the assistive devices in upper arm rehabilitation treatment and nerve rehabilitation treatment, so that the rehabilitation medical community has shown much attention in treatment using the assistive devices.

Walking rehabilitation using robots is classified into two types. The first is a treadmill-based rehabilitation training robot for patients who are unable to stand alone, for example, 'Locomat' of Hocoma. The second is a knee brace for patients who are able to stand alone, but need walking training. The knee brace is classified into a manual type and a motorized type using a robot technology. An example of the motorized type is 'BIONIC LEG' of AlterG.

The walking rehabilitation devices utilizing the robot technology collect and analyze the walking condition of the trainee from the sensors to improve the effectiveness of the rehabilitation training. The collected and analyzed items include a walking speed, a walking pattern, shift of a center of pressure (CoP), a knee angle, an ankle angle and the like. Among the above items, measuring the center of pressure (CoP) is more important than other items. The reason is that the walking pattern and the angles of the knee and ankle are changed according to the center of pressure.

Currently, as sensors for measuring the center of pressure (CoP), a plurality of strain gauges, multi-axis load cells, and pneumatic tubes are used.

In other words, there are a method of estimating the point of the center of gravity with the highest pressure direction by comparing pressure values applied to the respective axes by using the multi-axis load cells, a method of estimating the point of the center of gravity with the highest output value change zone after dividing a sole region into zones and attaching a plurality of strain gauges, and a method of performing estimation by using the pneumatic tubes and a plurality of force sensing registers (FSR) similarly to the method using the strain gauges.

One example of the above-described technology is disclosed in the following documents and the like.

For example, as shown in FIG. 1, Korean Patent Registration No. 10-0651639 (registered on Nov. 23, 2006) discloses an air tube 12 and a footplate 16 on which the air tube 12 is seated, a silicon pad 14 and the like, in which the air tube 12 has a concentric structure which is rolled several times, the footplate 16 is formed at front and rear sides thereof with a mounting hole 20 on which the air tube 12 is seated, the silicon pad 14 includes an upper silicon pad 14a and a lower silicon pad 14b respectively attached to a top surface and a bottom surface of the footplate 16 on which the air tube 12 is seated, a discharge tube 18 of the air tube 12 is connected to a pneumatic sensor attached to a calf operation device connected to an upper side of an ankle and sole operation device, the pressure change of the air tube 12 is detected while the pressure change is received in the unit of voltage, and an output end of the pneumatic sensor of a sole pressure sensor 10 is wire-connected to a control computer 108 embedded in a caster walker of an intelligent muscle force and walking assistive robot in such a manner that the output end may communicate with the control computer 108.

In addition, Korean Patent Registration No. 10-1246874 (registered on Mar. 18, 2013) discloses an exercise apparatus for measuring left/right side exercise information of a user body, in which a load cell including at least one strain gauge of which the length is changed by a driving force is provided, the load cell includes a driving force receiving part to which the driving force is directly applied and a curved part curved by the driving force receiving part, an exercise information generation unit calculates the driving force by using a voltage generated at both ends of the strain gauge, a position detection unit includes at least one detection point having predetermined positional relation with a position of the driving force receiving part and at least one sensor for detecting the detection point, and as the driving force receiving part is driven, one of the detection point and the sensor is driven, in which the detection point is formed on a rotary body rotated by the driving force receiving part and the sensor is fixed regardless of the rotation of the rotary body.

In addition, Korean Patent Registration No. 10-1138012 (registered on Apr. 12, 2012) discloses an apparatus for measuring the balance of a user at plural measurement postures including a pair of footplates adjusted in at least one of a vertical position, a horizontal position, and a slope according to the measurement postures and corresponding to left and right feet of the user, respectively, at least one sensor installed on the footplates for measuring a load applied to the footplates by the left and right feet of the user, and a central control unit for analyzing output signals of the sensors to measure the balance of the user for each measurement posture and generating health information of the user by using the balance for each measurement posture.

In addition, there are an increasing number of effective cases of rehabilitation using the robots in the upper arm rehabilitation treatment and the nerve rehabilitation treatment, so that the rehabilitation medical community has shown much attention in the treatment using the robots. For example, 'J. Perry and J. Bumfield, Gait Analysis: Normal and Pathological Function, 2nd Edition, SLACK Incorporated, 2010' discloses a technology for designing a controller to operate according to the walking of the user as the walking rehabilitation using the robots.

DISCLOSURE

Technical Problem

However, the sensors used in the conventional technologies described above are disadvantageous in that they are expensive or bulky. Therefore, in some systems, the force sensing register (FSR), which is a film type pressure sensor that detects whether the user's foot has made contact with or come off from the ground, is used to roughly estimate the center of pressure (CoP). The CoP estimation method using the FSR is relatively inexpensive, but only front and rear portions of foot may be estimated with only a small number of sensors, while left and right portions of the foot are difficult to be estimated. In other words, since the FSR sensor is a sort of tactile sensors, and a portion of a sole which actually makes contact with the ground may have a predetermined area other than a point, it is difficult to achieve the precise detection.

Specifically, the method using the load cell is disadvantageous in that the sensor itself is expensive and bulky. In addition, in the method using the strain gauge, the pneumatic tube, and the FSR, a plurality of sensors have to be arranged in each section, so that it is difficult to maintain the arrangement accuracy, an arrangement state and the like.

To solve the problems described above, an object of the present invention is to provide a system and a method for estimating the center of gravity of a walking rehabilitation robot, capable of estimating the center of gravity with a single sensor which is obtained by modularizing a position-dependent variable resistance sensor.

Another object of the present invention is to provide a system and a method for estimating the center of gravity of a walking rehabilitation robot, capable of accurately estimating the center of gravity by dividing the area of the sole and applying the pressure to the sensor.

Technical Solution

To achieve the objects described above, according to the present invention, there is provided a system for estimating a position of a center of gravity of a walking rehabilitation robot, the system including: a sensor module including a sensor unit mounted on a footplate to sense a ground reaction force when a person walks; an output unit for outputting a voltage value corresponding to a preset condition according to a pressure signal sensed by the sensor module; and an estimating unit for estimating the center of gravity by calculating an angle value corresponding to the voltage value outputted from the output unit.

In addition, in the system for estimating the center of gravity according to the present invention, the sensor unit may include a variable resistance sensor mounted on a rear portion or a front portion of the footplate and formed in a circular shape.

In addition, in the system for estimating the center of gravity according to the present invention, the sensor module may further include: a sensor mounting part having a circular groove for mounting the variable resistance sensor; and a cover member mounted on the sensor mounting part and provided with a plurality of protruding parts making contact with the variable resistance sensor to apply pressure of the person to the variable resistance sensor.

In addition, in the system for estimating the center of gravity according to the present invention, the variable resistance sensor may have a resistance value increased when the protruding parts make contact with the variable resistance sensor in a counterclockwise direction.

In addition, in the system for estimating the center of gravity according to the present invention, the protruding parts may include first to sixth protruding parts provided in a counterclockwise direction, and the first to sixth protruding parts may be formed of a silicon material and separated from each other.

In addition, in the system for estimating the center of gravity according to the present invention, the first to sixth protruding parts may be provided at angular intervals of 45 degrees.

In addition, in the system for estimating the center of gravity according to the present invention, the output unit may output the voltage value corresponding to the preset condition when one of the first to sixth protruding parts makes contact with the variable resistance sensor or when a plurality of the first to sixth protruding parts make contact with the variable resistance sensor.

In addition, to achieve the objects described above, according to the present invention, there is provided a method for estimating a position a center of gravity of a walking rehabilitation robot, the method including: (a) sensing pressure of a person by a variable resistance sensor mounted on a footplate; (b) outputting a voltage value corresponding to a preset condition according to a pressure signal sensed by the variable resistance sensor; and (c) estimating the center of gravity by calculating an angle value corresponding to the voltage value outputted in step (b).

In addition, in the method for estimating the center of gravity according to the present invention, in step (b), the voltage value corresponding to the preset condition may be outputted when one of first to sixth protruding parts makes contact with the variable resistance sensor, or when a plurality of the first to sixth protruding parts make contact with the variable resistance sensor.

In addition, in the method for estimating the center of gravity according to the present invention, in step (b), an increased resistance value may be outputted when the protruding parts make contact with the variable resistance sensor in a counterclockwise direction.

Advantageous Effects

As described above, according to the system and method for estimating the center of gravity of the walking rehabilitation robot of the present invention, even when a relatively inexpensive small sensor module is mounted, it is possible to extract the center of pressure by achieving the precise detection through the sensor module.

In addition, according to the system and method for estimating the center of gravity of the walking rehabilitation robot of the present invention, the variable resistance sensor mounted on the rear portion or the front portion of the footplate and formed in the circular shape is used, so that the system for extracting the center of pressure can be stably operated.

In addition, according to the system and method for estimating the center of gravity of the walking rehabilitation robot of the present invention, it is possible to precisely detect the ground reaction force which is applied when the person walks through the first to sixth protruding parts.

BEST MODE

Mode for Invention

The above-described and other objects and novel features of the present invention will become more apparent from the description of the present specification and the accompanying drawings.

First, the outline of the present invention will be described.

In the present invention, a position-dependent variable resistance sensor is used to supplement the disadvantages of the FSR method, in which the FSR is a low-priced sensor for measuring the center of pressure.

In other words, the variable resistance sensor is disposed on a footplate, for example, on a rear portion or a front portion of a shoe, and a position according to body weight bias is detected to estimate an approximate center of pressure (CoP). However, if the sensor is simply placed, the reliability of data is decreased because many points are simultaneously detected due to the sole area. Therefore, the present invention provides a device for applying pressure to the sensor by dividing the area of the sole and modularizes the same.

In addition, in order to verify the system according to the present invention, a comparative experiment is conducted with a pressure measurement sensor having a conventional FSR array structure, which results in 95% of a matching ratio in directionality.

Therefore, the present invention may be manufactured at a lower cost than the conventional system for estimating the center of gravity, and the estimation may be performed more stably.

Hereinafter, the configuration of the present invention will be described with reference to the drawings.

Figure 1:
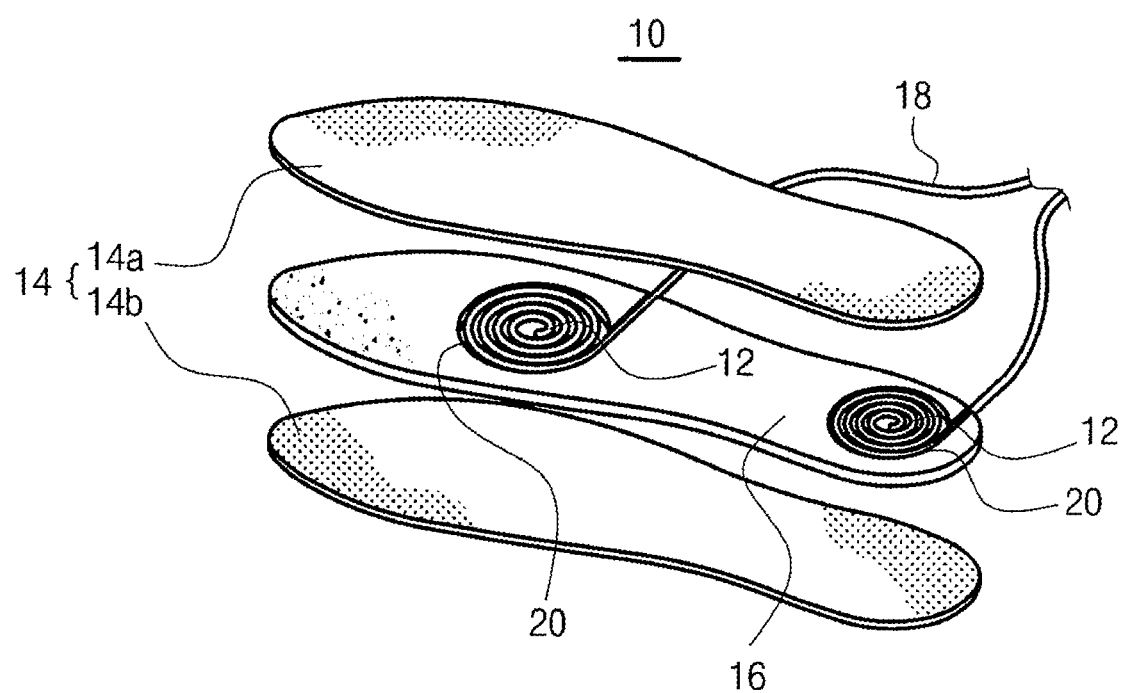
FIG. 1 is an exploded perspective view showing an example of a sole pressure sensor of an intelligent muscle force and walking assistive robot according to the related art.
Figure 2:
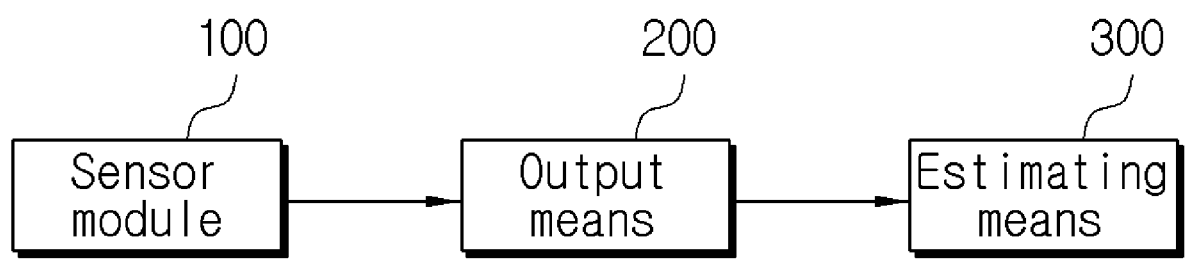
FIG. 2 is a block diagram showing a system for estimating a center of gravity of a walking rehabilitation robot according to the present invention.
Figure 3:
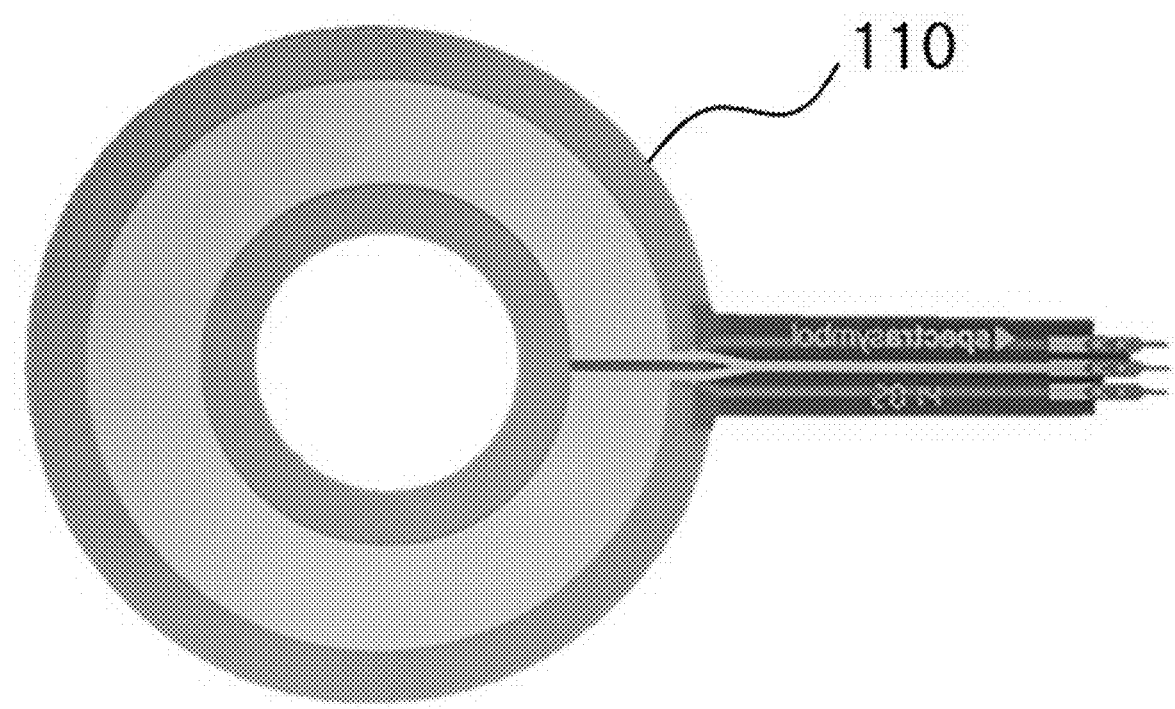
FIG. 3 is a sectional view showing a variable resistance sensor mounted on a sensor module shown in FIG. 2.
Figure 4:
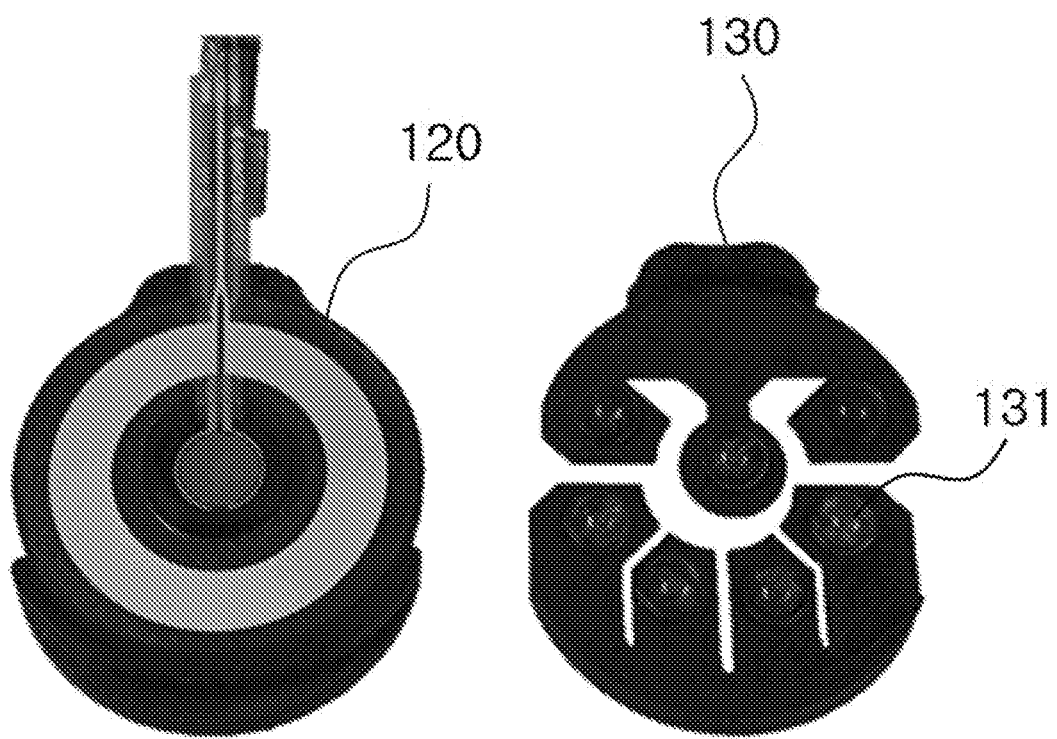
FIG. 4 is an external perspective view showing a sensor mounting part and a cover member mounted on the sensor module shown in FIG. 2.

FIG. 2 is a block diagram showing a system for estimating a center of gravity of a walking rehabilitation robot according to the present invention, FIG. 3 is a sectional view showing a variable resistance sensor mounted on a sensor module shown in FIG. 2, and FIG. 4 is an external perspective view showing a sensor mounting part and a cover member mounted on the sensor module shown in FIG. 2.

As shown in FIG. 2, according to the present invention, a system for estimating a position of a center of gravity of a walking rehabilitation robot includes: a sensor module 100 including a sensor unit mounted on a footplate provided on a shoe and the like to sense a ground reaction force when a person walks; output means 200 for outputting a voltage value corresponding to a preset condition according to a pressure signal sensed by the sensor module 100; and estimating means 300 for estimating the center of gravity by calculating an angle value corresponding to the voltage value outputted from the output means 200.

As shown in FIG. 3, the sensor module 100 includes: a sensor unit 110 including a variable resistance sensor mounted on a rear portion or a front portion of the footplate and formed in a circular shape; a sensor mounting part 120 having a circular groove for mounting the variable resistance sensor; and a cover member 130 mounted on the sensor mounting part 120 and provided with a plurality of protruding parts 131 making contact with the variable resistance sensor to apply pressure of the person to the variable resistance sensor.

The variable resistance sensor has been used in various industrial devices, for instance, the variable resistance sensor includes a frequency slider of an equalizer which is an acoustic device. The sensor for detecting a position applied in the present invention has a circular shape as shown in FIG. 3, other than a straight-line shape used in the existing frequency slider. As described above, since the structure of the sensor unit 110 has a substantially circular shape, it is possible to detect the direction of the side where the weight of the body is biased by locating the sensor unit 110 at the front portion or the rear portion of the sole of the person. However, since the sole is relatively flat, the sensor receives an input over a large area. In the present invention, the variable resistance sensor for detecting the position as described above has a problem in that resolution is greatly reduced when the input is applied over a large area, and accuracy is lowered when pressing with the sole of the person having a large area, so a mechanical structure as shown in FIG. 4 is provided.

In other words, there is provided a structure that the sole having a large area is divided in six directions as shown in FIG. 4, and the input is applied to the sensor with a narrow area. To this end, a substantially circular-shaped groove is formed in an inner peripheral circumference portion of the sensor mounting part 120 so as to be inserted with the sensor unit 110 for measuring the weight, and a lead wiring is provided at a central portion of the circular shape to hold the sensor unit 110 and measure the ground reaction force when walking.

The output means 200 is provided with a memory unit for storing a preset data value to output a voltage value corresponding to a sensed value corresponding to a preset condition, that is, each position of the variable resistance sensor, according to a pressure signal sensed by the variable resistance sensor.

The voltage value corresponding to the position sensed by the variable resistance sensor is stored in the memory unit, and the output means 200 is provided with a microprocessor for calculating the value stored in the memory unit and the sensed value so as to output the voltage value corresponding to the sensed position.

The estimating means 300 calculate an angle value according to the data stored in the memory unit corresponding to the voltage value outputted from the output means 200, and estimate the center of gravity of the person based on the angle value and transmit the estimated center of gravity to a personal computer or a smart phone.

For the transmission, the estimating means 300 are provided with a typical transmission unit for data transmission, and a transmission medium such as Bluetooth is used.

In addition, the output means 200 and the estimating means 300 are separately described in the above description, but the present invention is not limited thereto, and the output means 200 and the estimating means 300 may be integrally provided on one microprocessor.

Next, the structure of the sensor module according to the present invention will be described in detail with reference to FIGS. 5 to 7.

Figure 5:
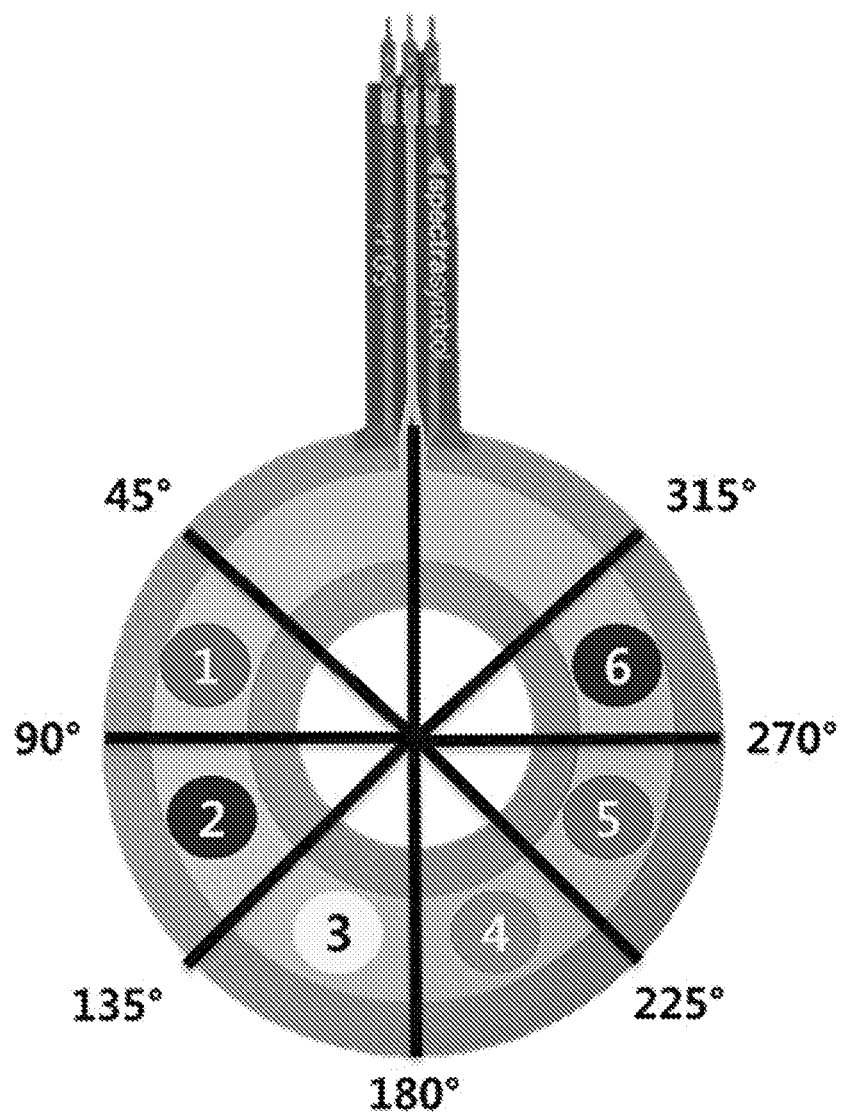
FIG. 5 is a view showing a divided sensing region of the variable resistance sensor shown in FIG. 3.
Figure 6:
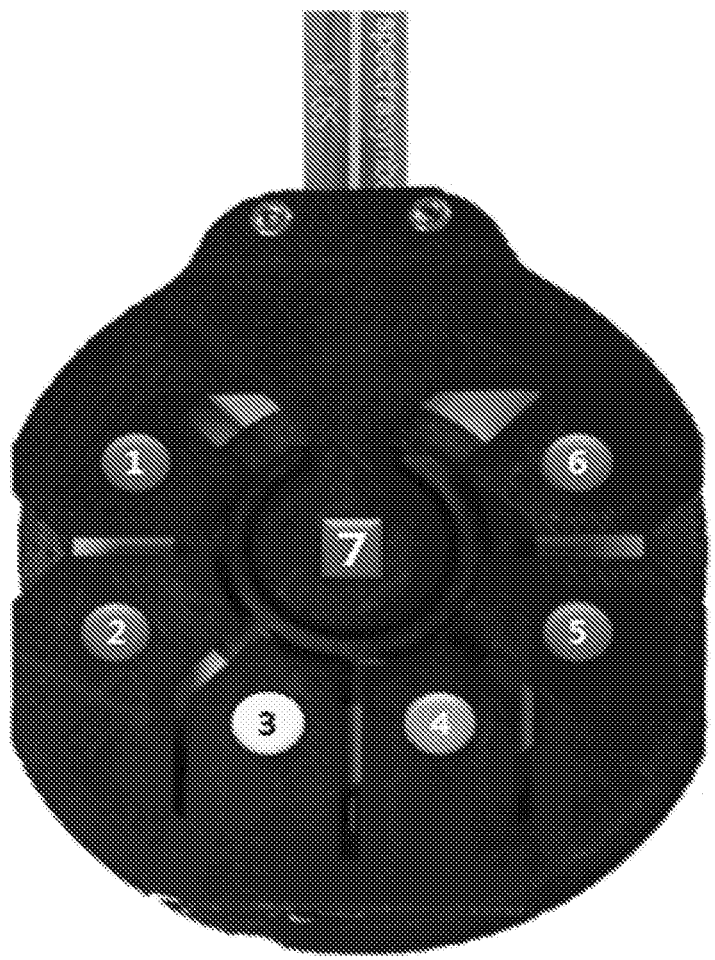
FIG. 6 is a view showing the sensor module shown in FIG. 2 in an assembled state.
Figure 7:
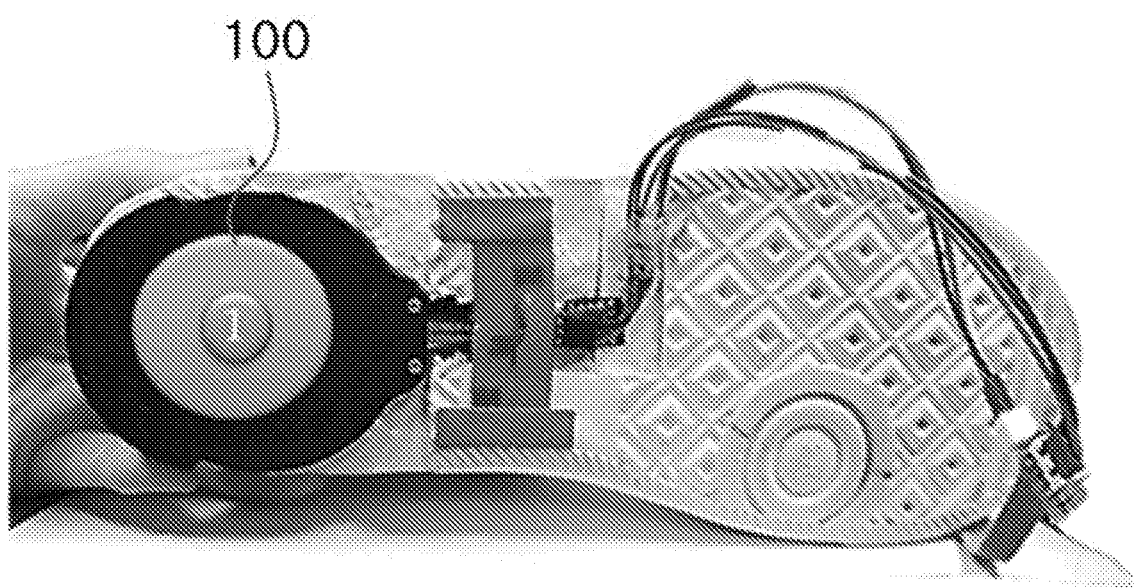
FIG. 7 is a photograph showing a state that the sensor module shown in FIG. 2 is mounted on a footplate.

FIG. 5 is a view showing a divided sensing region of the variable resistance sensor shown in FIG. 3, FIG. 6 is a view showing the sensor module shown in FIG. 2 in an assembled state, and FIG. 7 is a photograph showing a state that the sensor module shown in FIG. 2 is mounted on a footplate.

As shown in FIG. 5, in the sensor module according to the present invention, the variable resistance sensor, which is the sensor unit 110, performs detection at angular intervals of 45 degrees. In other words, the sensor unit 110 is partitioned at 45°, 90°, 135°, 180°, 225°, 270°, and 315° in the counterclockwise direction about the central portion as shown in FIG. 5. The first to sixth protruding parts ① to ⑥ make contact with the sensor unit 110 divided into six sections as described above.

In addition, the first to sixth protruding parts ① to ⑥ have a resistance value increased when making contact with the variable resistance sensor in the counterclockwise direction, and are formed of a silicon material and separated from each other to improve the durability of the sensor.

Therefore, the output means 200 output the voltage value corresponding to the condition preset in the memory unit when one of the first to sixth protruding parts ① to ⑥ makes contact with the variable resistance sensor or when a plurality of the first to sixth protruding parts ① to ⑥ make contact with the variable resistance sensor.

The variable resistance sensor applied to the present invention measures a resistance change amount by outputting the resistance change amount in a voltage value based on a voltage distribution law as shown in Equation 1 as follows.

$$V_{out} = (R_{ref}/R_{sensor}) \times V_{in}$$ [Equation 1]

In Equation 1, $V_{in}$ denotes an input voltage, $R_{ref}$ denotes a reference resistance, $R_{sensor}$ denotes a resistance value according to the pressure in the sensor, and $V_{out}$ denotes an output voltage.

Since the sensor applied to the present invention is the variable resistance sensor, the output value is acquired in the same manner. In addition, the sensor used in the present invention has a resistance value increased when the pressing point is moved in the counterclockwise direction. Therefore, the center of pressure (CoP) is estimated as an angle value as shown in Equation 2 as follows, based on the output values at both left and right end points.

$$\text{Angle} = (360/R_{Max}) \times R_{measure\_value}$$ [Equation 2]

The maximum value of the angle in Equation 2 is not 360 degrees because the characteristics of the sensor are considered.

Accordingly, the voltage values detected in the first to sixth protruding parts ① to ⑥ and the corresponding angle values are defined as shown in Table 1 as follows and stored in the memory unit. Table 1 shows the detection values and the angle values obtained in six sections dedicated for the first to sixth protruding parts ① to ⑥, respectively.

TABLE 1

| Measure value of Sensor | |
|---|---|
| Volt value of Position | Degree value of Position |
| 0.92 V (Position 1) | 66° |
| 1.52 V (Position 2) | 110° |
| 2.20 V (Position 3) | 159° |
| 2.80 V (Position 4) | 202° |
| 3.41 V (Position 5) | 247° |
| 4.05 V (Position 6) | 393° |

However, the set values as shown in Table 1 are specified values for explaining the present invention, but the present invention is not limited thereto, and the set values can be modified in a predetermined range.

The sensor module 100 assembled corresponding to the first to sixth protruding parts ① to ⑥ defined as described above is as shown in FIG. 6.

In the present invention, in order to perform the performance test of the sensor unit 110 in the sensor module manufactured as shown in FIG. 6, the sensor unit 110 is mounted on the lower rear portion of the running shoes as shown in FIG. 7 and the position detection experiment is performed with six divided sections. The results are obtained as shown in Table 1.

The experiment will be described with reference to FIGS. 8 to 11.

Figure 8:
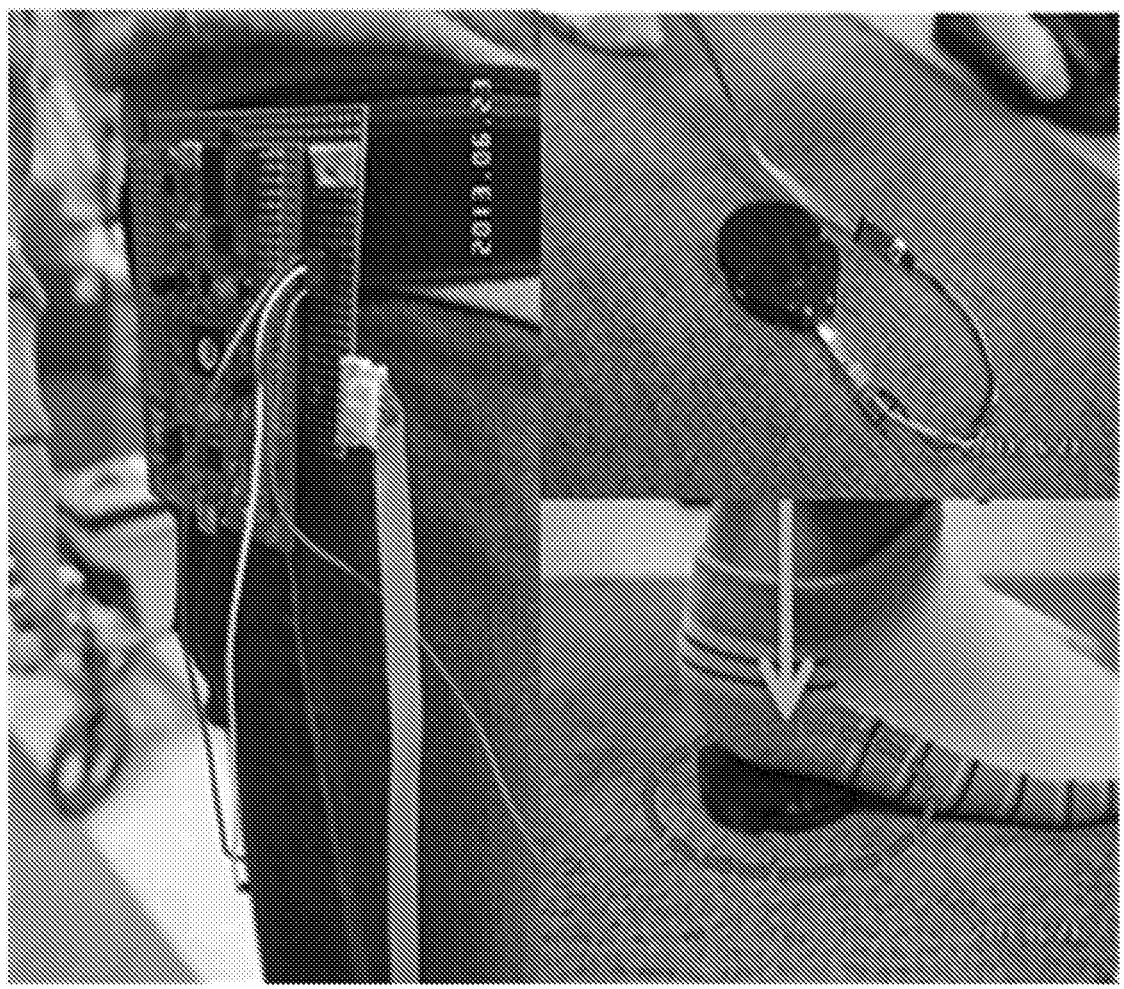
FIG. 8 is a photograph showing implementation of the system for estimating the center of gravity of the walking rehabilitation robot according to the present invention.
Figure 9:
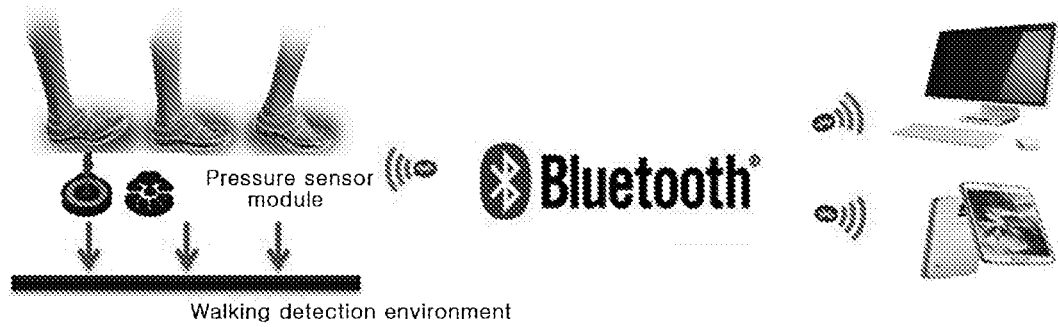
FIG. 9 is a view for explaining an operation process of the system for estimating the center of gravity of the walking rehabilitation robot according to the present invention.
Figure 10:
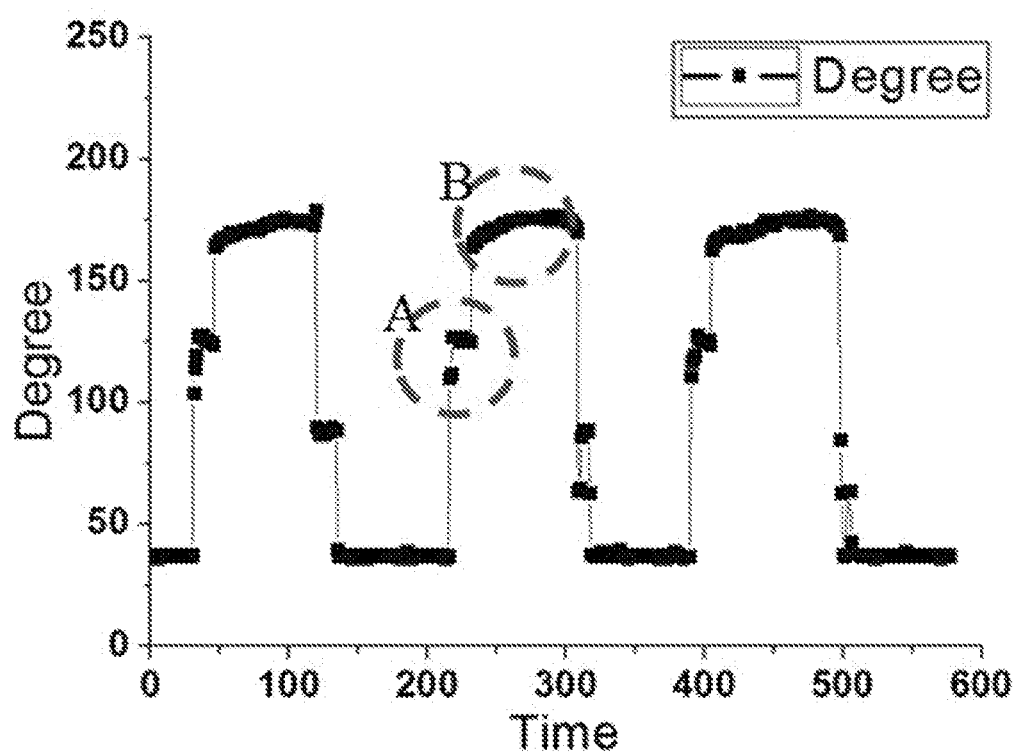
FIG. 10 is a graph showing experimental results in a flat section by applying the system for estimating the center of gravity of the walking rehabilitation robot according to the present invention.
Figure 11:
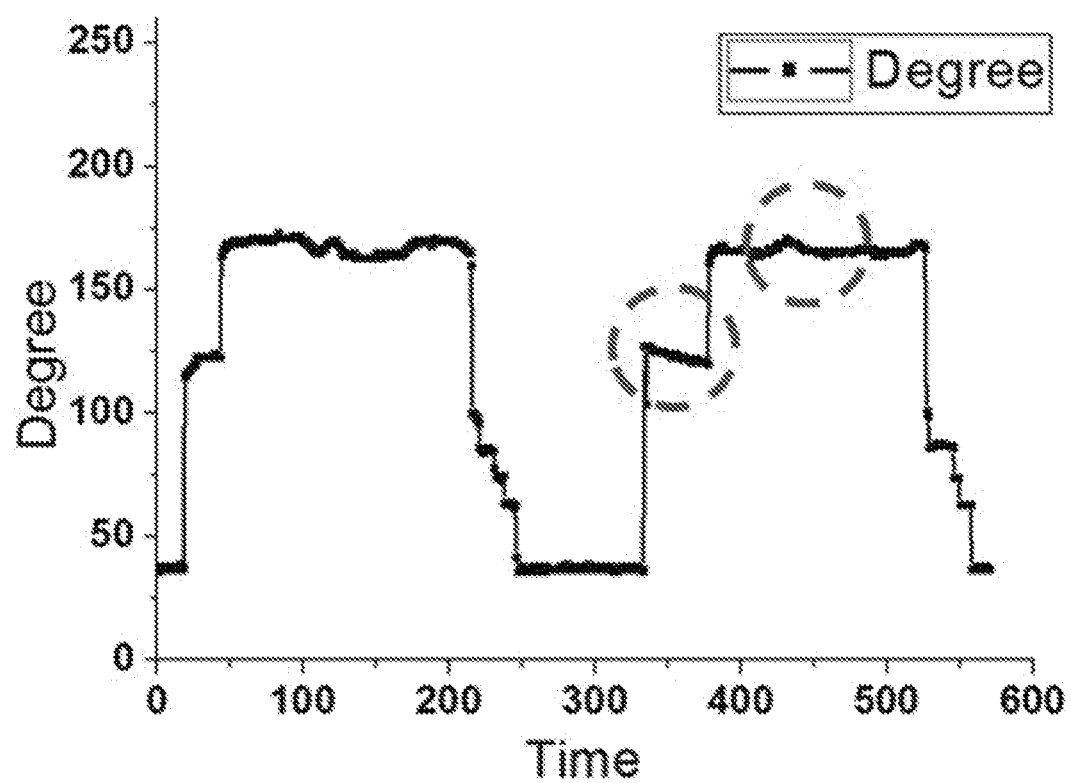
FIG. 11 is a graph showing experimental results in a side surface slope section inclined from left to right by applying the system for estimating the center of gravity of the walking rehabilitation robot according to the present invention.

FIG. 8 is a photograph showing implementation of the system for estimating the center of gravity of the walking rehabilitation robot according to the present invention, FIG. 9 is a view for explaining an operation process of the system for estimating the center of gravity of the walking rehabilitation robot according to the present invention, FIG. 10 is a graph showing experimental results in a flat section by applying the system for estimating the center of gravity of the walking rehabilitation robot according to the present invention, FIG. 11 is a graph showing experimental results in a side surface slope section inclined from left to right by applying the system for estimating the center of gravity of the walking rehabilitation robot according to the present invention, and FIG. 10 is a graph showing experimental results in a side surface slope section inclined from right to left by applying the system for estimating the center of gravity of the walking rehabilitation robot according to the present invention.

In addition, in the present invention, data is acquired when the pressure is applied simultaneously to at least two sections due to the sole area of the person other than the respective sections as shown in Table 1 in the first to sixth protruding parts ① to ⑥ shown in FIG. 6. The acquisition results are shown in Table 2 and Table 3. Table 2 shows the detection values and the angle values acquired in the two sections of the first to sixth protruding parts ① to ⑥, and Table 3 shows the detection values and the angle values acquired in more than two sections of the first to sixth protruding parts ① to ⑥.

TABLE 2

| | Measure value of Sensor | | | | |
|---|---|---|---|---|---|
| Positions | 1 and 2 | 2 and 3 | 3 and 4 | 4 and 5 | 5 and 6 |
| V | 0.68 V | 1.03 V | 1.45 V | 1.73 V | 2.11 V |
| Deg | 83° | 125° | 175° | 207° | 255° |
| Positions | 1 and 3 | 2 and 4 | 3 and 5 | 4 and 6 | |
| V | 0.72 V | 1.20 V | 1.70 V | 2.10 V | |
| Deg | 86° | 145° | 205° | 252° | |
| Positions | 1 and 4 | 2 and 5 | 3 and 6 | | |
| V | 0.86 V | 1.46 V | 2.06 V | | |
| Deg | 103° | 175° | 250° | | |
| Positions | 1 and 5 | 2 and 6 | | | |
| V | 1.07 V | 1.86 V | | | |
| Deg | 130° | 223° | | | |
| Positions | 1 and 6 | | | | |
| V | 1.48 V | | | | |
| Deg | 178° | | | | |

TABLE 3

| | Measure value of Sensor | | | |
|---|---|---|---|---|
| Positions | 1~6 | 2~6 | 3~6 | 4~6 |
| V | 1.48 V | 1.83 V | 2.02 V | 2.08 V |
| Deg | 178° | 220° | 245° | 250° |
| Positions | 1~5 | 2~5 | 3~5 | |
| V | 1.09 V | 1.45 V | 1.70 V | |
| Deg | 130° | 175° | 204° | |
| Positions | 1~4 | 2~4 | | |
| V | 0.88 V | 1.20 V | | |
| Deg | 106° | 145° | | |
| Positions | 1~3 | | | |
| V | 0.73 V | | | |
| Deg | 88° | | | |

From Table 1 and Table 2, it can be seen that the proposed position detection is accurately detected in the single input. However, referring to Table 3, in more than two sections, the accuracy of the data is lowered in the section within a range of less than 30° to more than 330°. In addition, in a section with more than 330°, and an error of outputting data to a section with 330° or more is generated when the pressure is applied thereto simultaneously with other sections. Therefore, in the present invention, in order to prevent the pressure from being detected in a central upper portion, the section is excluded to prevent the pressure from being applied, as shown in FIGS. 5 and 6. In addition, the set values as shown in Tables 2 and 3 are also specified values for explaining the present invention, but the present invention is not limited thereto, and the set values can be modified in a predetermined range.

In the present invention, as shown in FIG. 8, the center of gravity of the person is estimated by mounting the sensor module 100 to perform the method for estimating the center of gravity.

First, the variable resistance sensor mounted on the footplate provided in the shoe detects the pressure of the person.

A voltage value corresponding to a preset condition according to a pressure signal sensed by the variable resistance sensor is outputted, an angle value is calculated and the center of gravity is estimated according to the outputted voltage value with reference to Tables 1 to 3, and an observer may acquire the walking information of the person by transmitting the walking information to a personal computer or a smart phone as shown in FIG. 9. The transmission may be implemented through Bluetooth, which is a close-range communication network.

In addition, walking sections are divided into a flat section, an ascent section and a lateral section for experiment to verify the reliability of the sensor module in the present invention. In other words, walking experiment is performed in the flat/slope/lateral sections, and the experiment result shows that the center of gravity may be estimated in all the three sections.

Figure 12:
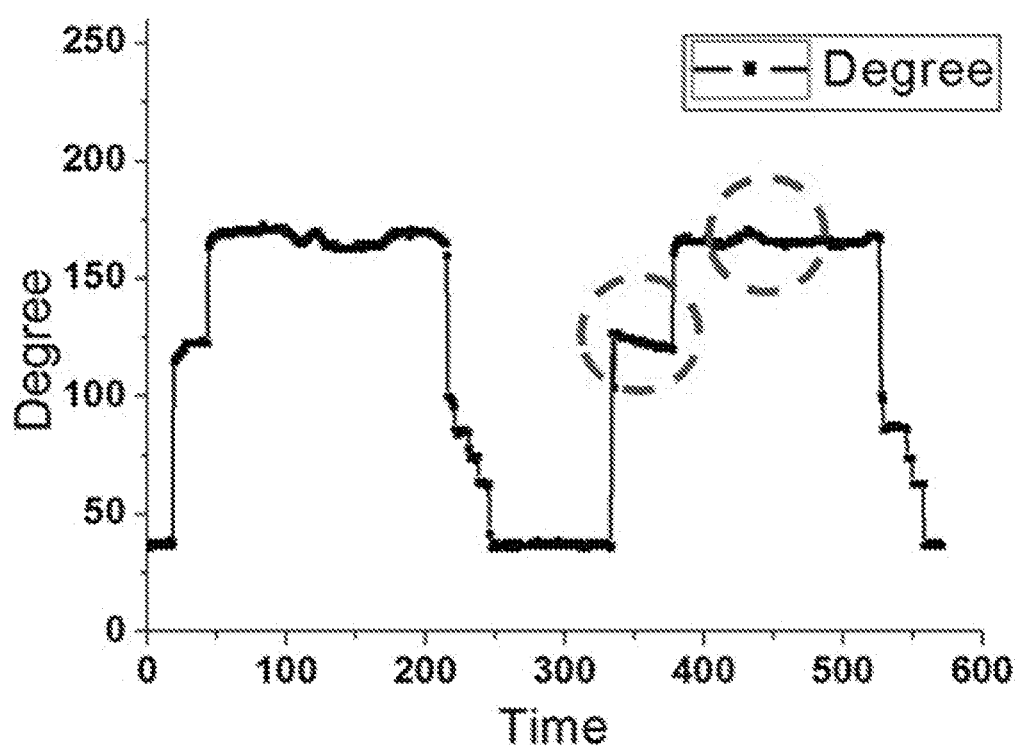
FIG. 12 is a graph showing experimental results in a side surface slope section inclined from right to left by applying the system for estimating the center of gravity of the walking rehabilitation robot according to the present invention.

The graphs for the experiment results are shown in FIGS. 10 to 12.

As seen from FIG. 10, the weight shift is detected in the left/right direction when moving from the stance phase to the swing phase during walking on a flat land as a result of the experiment. It is confirmed that the sensor module according to the present invention is effective for estimating the center of pressure (CoP) due to the characteristics expressed in the walking pattern.

In addition, the weight biases in the direction of the slope are detected as in the sections B and C in FIGS. 11 and 12 in the slope and the lateral sections. For the accuracy of the experiment, the directionality comparison experiment is performed by disposing the FSR in an array on the sole and measuring the pressure distribution. As a result of the comparison, the pressure bias directionality in the sensor module according to the present invention and the FSR array sensor has shown 95% of a matching ratio. Therefore, according to the present invention, it has been proved that a low-price sensor may be used to estimate the center of pressure (CoP) during the walking.

Based on the above results, it has been determined that the system and method for estimating the center of gravity of the walking rehabilitation robot according to the present invention may be useful for estimating the center of pressure (CoP) in a low-priced walking rehabilitation robot.

Although the present invention invented by the present inventor has been described in detail with reference to the embodiments, the present invention is not limited to the above embodiments, and various modifications are possible without departing from the scope and spirit of the present invention.

In other words, the system and method for estimating the center of gravity of the walking rehabilitation robot, which is a wearable robot for recovering the walking function of the senior citizens, are described in the above embodiments, but the present invention is not limited thereto. The present invention may also be used as a system for checking a walking condition to prevent diseases caused by a walking habit of an ordinary person, and may be applied to a system for checking a walking condition of a person with physical impairment in a specially produced shoe for assisting the person with physical impairment and the like.

INDUSTRIAL APPLICABILITY

By using the system and method for estimating the center of gravity of the walking rehabilitation robot according to the present invention, even when a relatively inexpensive sensor module is mounted, it is possible to extract the center of pressure by achieving the precise detection, and the system may be operated stably.

The invention claimed is:

1. A system for estimating a center of gravity of a pedestrian using a walking rehabilitation robot, the system comprising:

a sensor assembly mounted on a rear portion or a front portion of a footplate and including six variable resistance sensors divided and arranged at intervals of 45° in a circular shape, and a cover member having first to sixth protruding parts separated from each other to come into contact with the six variable resistance sensors;

an output device including a memory for storing voltage values corresponding to pressure signals sensed at respective positions of the six variable resistance sensors, and a microprocessor configured to output the voltage values; and an estimating processor for calculating angular values of positions of the first to sixth protruding parts in response to the voltage values outputted from the output device and for estimating the center of gravity of the pedestrian according to the calculated angular values, wherein sensing of pressure is excluded in an upper section of a center portion of the sensor assembly.

2. The system of claim 1, wherein the sensor assembly further includes a sensor mounting part formed therein with a circular groove on which the six variable resistance sensors are mounted and wherein the cover member is mounted on the sensor mounting part.

3. The system of claim 1, wherein a resistance value of each of the six variable resistance sensors when the first to sixth protruding parts come into contact with the six variable resistance sensors in a counterclockwise direction.

4. A method of estimating the center of gravity of the pedestrian using the walking rehabilitation robot by using the system of claim 1, the method comprising:

sensing, by the sensor assembly, a pressure applied by the pedestrian;

selecting and outputting, by the output device, the voltage values; and calculating, by the estimating processor, the angular values of the positions of the first to sixth protruding parts in response to the voltage values.

5. The method of claim 4, wherein the selecting and outputting the voltage values includes outputting a resistance value which is increased when the first to sixth protruding parts come into contact with the six variable resistance sensors in a counterclockwise direction.

* * * * *